United States Patent
Chien et al.

(10) Patent No.: US 10,074,208 B2
(45) Date of Patent: Sep. 11, 2018

(54) AUTOMATED COMPARISON OF 3D IMAGES

(71) Applicant: THE REGENTS OF THE UNIVERSITY OF CALIFORNIA, Oakland, CA (US)

(72) Inventors: Aichi Chien, Los Angeles, CA (US); Tim Cheng, Santa Barbara, CA (US); Xin Yang, Fremont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 102 days.

(21) Appl. No.: 15/242,111

(22) Filed: Aug. 19, 2016

(65) Prior Publication Data
US 2017/0053417 A1    Feb. 23, 2017

Related U.S. Application Data

(60) Provisional application No. 62/207,974, filed on Aug. 21, 2015.

(51) Int. Cl.
| G06K 9/00 | (2006.01) |
| G06T 15/08 | (2011.01) |
| G06T 7/12 | (2017.01) |
| G06T 7/149 | (2017.01) |

(52) U.S. Cl.
CPC ............ *G06T 15/08* (2013.01); *G06T 7/12* (2017.01); *G06T 7/149* (2017.01); *G06T 2207/10076* (2013.01); *G06T 2207/20116* (2013.01); *G06T 2207/30016* (2013.01); *G06T 2207/30101* (2013.01)

(58) Field of Classification Search
CPC ........... G06T 15/08; G06T 2207/10076; G06T 2207/20116; G06T 2207/30016; G06T 2207/30101; G06T 7/12; G06T 7/149
See application file for complete search history.

(56) References Cited

U.S. PATENT DOCUMENTS

2016/0171716 A1* 6/2016 Schafer ................. G06T 11/005
                                                                382/107

OTHER PUBLICATIONS

Yushkevich, Paul A., et al. "User-guided 3D active contour segmentation of anatomical structures: significantly improved efficiency and reliability." Neuroimage 31.3 (2006): 1116-1128. (Year: 2006).*

Shang, Yanfeng, et al. "Vascular active contour for vessel tree segmentation." IEEE Transactions on Biomedical Engineering 58.4 (2011): 1023-1032. (Year: 2011).*

* cited by examiner

*Primary Examiner* — Nirav G Patel
(74) *Attorney, Agent, or Firm* — O'Banion & Ritchey LLP; John P. O'Banion

(57) ABSTRACT

A method and apparatus for automated comparison of 3D images, such as specific shapes in images, for example, for detecting vascular changes and aneurysm growth. The method comprises an adaptive geodesic active contour (GAC) approach which can be performed in a single pass, or across multiple iterations. The method uniquely utilizes shape to identify targets in two 3D images so that images can be compared if there is any shape feature. A method is also described for iterative parameter image construction, which beneficially removes false positives. The technology is particularly well-suited for use in comparing geometric changes of aneurysms, tumors, thromboses, inflammations.

36 Claims, 11 Drawing Sheets

AUTOMATED COMPARISON OF 3D IMAGES

CROSS-REFERENCE TO RELATED APPLICATIONS

This application claims priority to, and the benefit of, U.S. provisional patent application Ser. No. 62/207,974 filed on Aug. 21, 2015, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to 3D image segmentation, and more particularly to clinical 3D image diagnostics of blood vessels and aneurysms.

2. Background Discussion

A number of 3D image segmentation methods have been developed; however, these methods rarely achieve satisfactory performance for 3D segmentation due to the complex structure, limited image resolution, and generation of unwanted artifacts. Several efforts have been made to adapt existing methods, such as active contour methods, to 3D segmentation by leveraging specific characteristics (i.e., hyper-intensity and tubular-like shapes) of vessels. One segmentation method utilized a ball measurement, in which a ball was used as an initial shape to penalize local widening of contours and to maintain the shape elongation. However, this method can incorrectly penalize local enlargement due to aneurysms and bifurcations, resulting in incomplete segmentation at those locations.

Several vessel-dedicated features have been proposed to produce a force field which drives the contours towards vessel edges. Notable results include the spherical flux measure, optimally oriented flux, the Hessian-based vessel filter, and so forth. Recently, a non-parametric geodesic active contours (GAC) approach was proposed which incorporates high-order multiscale features to model the region of interest.

Despite performance improvements demonstrated by these methods dedicated to 3D segmentation, setting proper values for a set of parameters to achieve optimized results remains problematic for users. One approach, referred to as ITK-SNAP, provides an open-source software which utilizes a user-friendly interface and feedback to facilitate parameter selection for medical image segmentation. However, the method still requires manual configuration, while the software only allows a single configuration that is globally applied to all voxels in the entire 3D image that often leads to sub-optimal performance.

One of the most popular approaches for segmentation is the application of enhancement filters to individual pixels and then to classify pixels. Several enhancement filters have been proposed which utilize second-order derivatives to distinguish specific shapes, such as having a locally prominent low curvature orientation (i.e., the vessel direction) and planes of high intensity curvature (i.e., the cross-sectional planes). The Hessian matrix is the most common tool to capture tubular structure information. Eigenvalues of a Hessian matrix can discriminate between plane-, blob- and tubular-like structures, and eigenvectors indicate the vessel orientations. An example of a Hessian-matrix based method is a vesselness filter which has been extensively used in practice, owing to its intuitive geometric formulation. The Weingarten matrix is a less popular alternative to the Hessian matrix.

Instead of analyzing second-order derivatives, another group of methods exploit the local distribution of gradient vectors. One instance performs an eigenvalue analysis on the covariance matrix of gradient vectors. Another instance leveraged a vector field obtained from gradient vector flow (GVF) diffusion. Still another proposed approach is optimally oriented flux (OOF) which relies on the measure of gradient flux through the boundary of local spheres. Comparing to Hessian-based filters, OOF is claimed to be more accurate and less sensitive to disturbances from adjacent structures.

One proposal estimates the eigenvalue distribution of the covariance matrix of gradient vectors via Expectation Maximization (EM). Support Vector Machines (SVM) operating on the Hessian's eigenvalues have been used to discriminate between target and nontarget pixels. In another proposal, rotational features were computed at each pixel using steerable filters and fed to an SVM to classify pixels as vessels or not. Inspired by use of these rotational features, a series of improvements were made by including more filters (i.e., vesselness and OOF) in addition to steerable filters and leveraging more advanced machine learning techniques.

It should be noted that both handcrafted and learned filters rely on image gradients or high-order derivatives. Therefore the results are sensitive to noise and often too weak to discriminate target pixels in low contrast regions.

One application of these 3D image processing techniques is in applications such as vascular imaging and aneurysm growth detection and segmentation. Current angiogram outputs inevitably contain noise and exhibit inhomogeneous contrast. The intensity of some vessels (particularly narrow vessels) could differ from the background by as little as four grey levels, yet the background noise standard deviation is 2.3 grey levels. As a result, most if not all, existing filters lose effectiveness in those low contrast, low SNR regions. In addition, vascular filters usually provide weak responses around vascular borders, yielding difficulties in precisely localizing the true boundary of a vessel tube. Imprecise boundary localization could consequently result in inaccurate quantification of pathologies and diagnosis. Based on the segmented vessels, aneurysms can be detected a posteriori as local radius increases, or by 3D curvature analysis.

Experiments from the literature suggest local radius and volume increase as possible indicators of most prominent aneurysms. In addition, aneurysm could also be detected by specific Hessian-based aneurysm detectors. Other techniques dedicated to aneurysm detection and segmentation include learning models and volume-based estimation.

Accordingly, a need exists for advanced segmentation approaches, which provide for increased accuracy while not requiring complex parameter modifications by a highly trained clinician. The present disclosure fulfills that need and provides additional benefits for performing 3D image segmentation, such as for 3D imaging for blood vessels, aneurysms, tumors, thromboses, inflammations and so forth.

BRIEF SUMMARY

The disclosed technology provides for quickly and accurately comparing geometrical information in 3D images, such as specific shapes in images. For example, the technology can be used to detect brain aneurysm growth. Existing methods to compare 3D images are generally based on voxel intensity or manual measurements. In one embodiment, the technology is a comparison method based on shape. This method is unique because it uses shape to identify targets in two 3D images so that images can be compared if there is any shape feature. In one embodiment, the mechanism of practicing this technology is to assist medical clinical evaluation and surgical planning. In one embodiment, the technology may be used to segment and compare the geometric changes of aneurysms, tumors, thromboses, inflammations. One embodiment describes the technology being utilized to document disease changes and provide information for treatment strategy.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Adaptive Parameter Setting

The presently disclosed apparatus and method for automated comparison of 3D images can provide enhanced analysis in a wide range of fields. Numerous applications exist in the medical field, for example in regard to detecting/predicting cerebral aneurysms.

A cerebral aneurysm is an abnormal enlargement of any artery located at or near bifurcations of the arteries in the Circle of Willis. Aneurysm rupture accompanied with subarachnoid hemorrhage (SAH) is a serious complication which causes 32% to 67% fatality and 10.9% morbidity due to intracranial bruise, subsequent recurrent bleeding, stroke, hydrocephaly and vessel spasm.

Computed Tomography Angiograph (CTA) is one of the most frequently used diagnostic images for vessel examination and aneurysm detection. The segmentation of aneurysm and the surrounding vascular structure on CTA images has a significant role in diagnosis and treatment planning. Despite the tremendous amount of dedicated research, automatic vascular segmentation on CTA images remains challenging due to noises, inhomogeneous image intensity and gradient, and the presence of bone tissues which are close to vessels and have similar intensity values as vessels.

Utilizing active contour within the level set framework has been widely accepted as a suitable technique for vascular segmentation as it is able to deal with topology changes and adapt to the shape of complex structures, such as blood vessels. However, the outcome of active contour segmentation depends on a number of parameters. Finding the right set of parameters can be difficult even for expert users familiar with the process. In addition, vessels usually present high appearance variability due to the contrast agent inhomogeneity, noises and image artifacts. As a result, a global parameter configuration for all voxels of an image can hardly achieve satisfactory results.

Figure 1A:
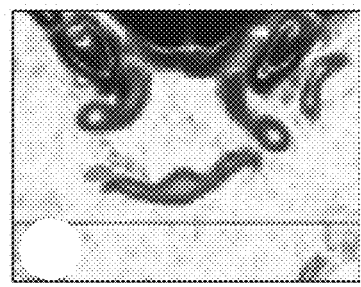
FIG. 1A through FIG. 1C are slice images from a first configuration when performing 3D image segmentation.
Figure 1B:
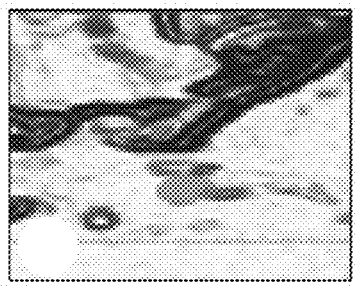
Figure 1C:
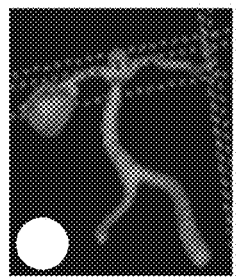

FIG. 1A through FIG. 1C, and FIG. 2A through FIG. 2C compare exemplar segmentation results based on two configurations. Configuration A is seen in FIG. 1A through FIG. 1C, which can suppress noises on a first slice as in FIG. 1A, while it causes discontinued boundary on a second slice in FIG. 1B, and in turn causes leakage as indicated in FIG. 1C.

Figure 2A:
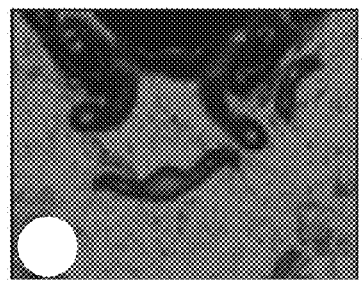
FIG. 2A through FIG. 2C are slice images from a second configuration when performing 3D image segmentation.
Figure 2B:
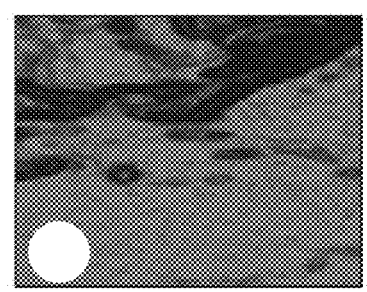
Figure 2C:
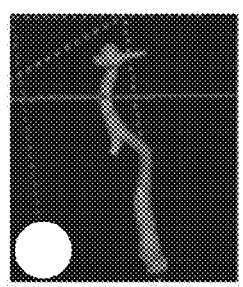

In FIG. 2A through FIG. 2C a configuration B is depicted which enhances gradients to ensure a closed boundary on a second slice seen in FIG. 2B, while it increases noises within the vessel on a first slice seen in FIG. 2A, yielding an incomplete segmentation. Difficulties in parameter selection greatly discourage the use of active contour techniques in the clinical environment. An adaptive and location-dependent configuration method is of high demand to bridge the gap between segmentation method advancement and clinical routine, while insufficient effort has been made in this direction.

The present disclosure provides a focus on adaptive parameter setting for Geodesic Active Contours (GAC); which is a widely-utilized active contour method relying on gradient information for contour evolution. A key parameter of GAC that critically affects the final segmentation results and is sensitive to image content lies in the step of gradient mapping. One of the key elements of the presently disclosed method is that of utilizing shape information as prior knowledge to guide parameter setting in this step. Specifically, a parameter image is constructed, each voxel of which is determined by shape filtering and is used to configure the mapping function for the corresponding voxel of an input image. The result of shape filtering inevitably contains noises which result in errors in the parameter image and in turn mislead the configuration of GAC. To address this problem, the shape-based parameter image is iteratively corrected using the result of gradient mapping since it provides complementary information to the shape and thus is less likely to have errors at the same location.

An evaluation study over eight (8) clinical datasets demonstrates that the disclosed method achieves 86.1 to 99.2% segmentation accuracy with respect to the ground-truth. Compared to two widely-used active contour methods (i.e., geodesic active contours and region completion) with manual performance optimization, the presently disclosed method can achieve consistently greater segmentation accuracy in addition to significant reduction in the configuration effort.

1.A Geodesic Active Contours

In this section, a brief introduction of Geodesic Active Contours is given followed by details of the present disclosure regarding adaptive parameter setting.

Active contour segmentation constitutes a popular class of image segmentation techniques that evolve a closed curve/surface through a combination of different forces: external forces derived from the image, and internal forces derived from the contour's geometry which are used to impose regularity constraints on the shape of the contour. GAC defines forces acting on the contour as:

$$F = \alpha g_I + \beta \kappa + \gamma (\nabla g_I \cdot \vec{N}), \quad (2)$$

where $g_I$ is the speed function derived from the gradient magnitude of the input image I and acts outward to drive the contour to expand; $\kappa$ is the mean curvature of the contour which controls the smoothness of the evolving curve; $\vec{N}$ is the unit normal to the contour and $\nabla g_I \cdot \vec{N}$ is called advection forces which act inwards when the contour approaches an edge and is parallel to it; $\alpha$, $\beta$ and $\gamma$ are weights modulating the relative contributions of the three components of F.

The speed function $g_I$ is derived as follows:

$$g_I(x) = \frac{1}{1 + (NGM_I(x)/v)^2} \quad (3)$$

$$NGM_I(x) = \frac{\|\nabla (G_\sigma * I(x))\|}{\max_I \|\nabla (G_\sigma * I(x))\|}$$

where $NGM_I$ is the normalized gradient magnitude of $I(x)$; $G_\sigma * I(x)$ denotes convolution of $I(x)$ with an Gaussian kernel $G_\sigma$; v is a user-specified parameter that determines the shape of the monotonic mapping between a normalized gradient magnitude and a speed function. According to Eq. (3), the value of $g_I$ is close to 0 at the edges and close to 1 in regions where intensity is nearly constant.

Choices of $\alpha$, $\beta$, $\gamma$ and v affect the outcome of GAC, but we observe that the value of v is much more content-dependent than the other three parameters. The variances of optimal values are evaluated for each parameter with respect to different images. Specifically, by way of example and not limitation eight (8) different datasets of optimal parameter values are exhaustively searched for each dataset and for each parameter the variance of the eight (8) optimal values is calculated. Experimental results show that optimal values for $\alpha$, $\beta$ and $\gamma$ remain the same for all datasets (i.e., variance is 0) while optimal values of v vary significantly (i.e., variance is approximately 30% of the mean). In addition, due to inhomogeneous image gradient on vessel boundaries, a single choice of v may either lead to a large $g_I$ at the boundary of a vessel which has a small gradient value, yielding leakage illustrated in FIG. 1A through FIG. 1C, or cause a small $g_I$ inside a vessel tube due to high frequency noises, yielding incomplete segmentation as illustrated in FIG. 2A through FIG. 2B. Therefore, the value of v should be determined according to image contents and could have different values for different regions, or even voxels. In the following, we present our content-based method for adaptive selection of v.

1.B. Adaptive Parameter Setting for Speed Function

One key characteristic of blood vessels is their specific shapes. An operating principle of the disclosed method is to utilize this shape information as prior knowledge to guide the mapping between gradient and speed function so that gradients at boundaries of vessel-like regions are enhanced while those inside or outside vessel-like regions are suppressed. Specifically, the outcome of this adaptive configuration process is a parameter image which is constructed based on shape filtering and each element of a parameter image is used to configure the speed function for the corresponding voxel of an input image.

A number of methods have been developed for vessel-like shape filtering. These methods usually use tubes and blobs to model shapes of healthy vessels and aneurysms respectively. Shape filters are designed with the goal of producing large response values at locations close to the centers of tube-like or blob-like regions, small values at borders of tube-like or blob-like regions and a zero value everywhere else. With the modified speed function as seen in Eq. (4) below, responses of shape filtering v(x) meet the objective of amplifying gradients at vessel borders, reducing gradients inside vessels, and removing gradients on non-vessel tissues, and thus can be used as the parameter image in this disclosure.

$$g_I(x) = \begin{cases} \dfrac{1}{1 + (NGM_I(x)/(v(x)))^2} & v(x) \neq 0 \\ 1 & v(x) = 0 \end{cases} \quad (4)$$

Figure 3A:
FIG. 3A through FIG. 3C are slice images showing a gradient image, initial parameter image, and updated parameters image, respectively, utilized according to an embodiment of the present disclosure.
Figure 3B:
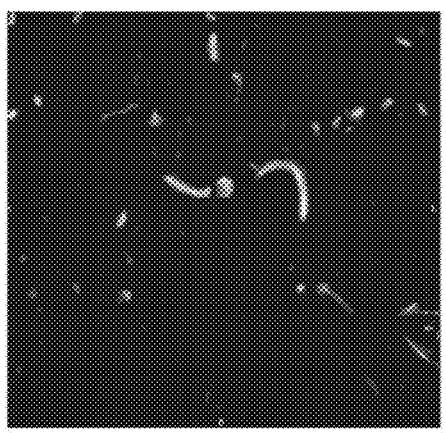
Figure 3C:
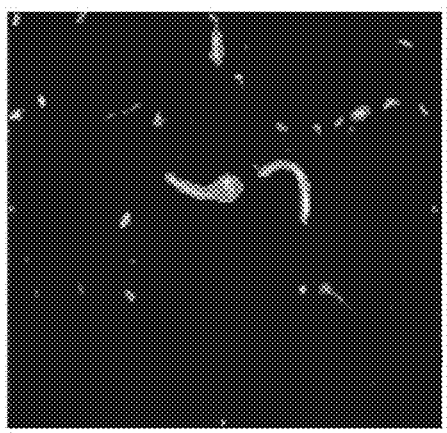

FIG. 3A through FIG. 3C illustrate various slice images, with a gradient image of a slice in FIG. 3A, an image using initial parameters in FIG. 3B, and an image using the updated parameters of the slice seen in FIG. 3C.

An error-free shape-based parameter image is difficult to achieve, especially at sites where geometric structure of vessels cannot be approximated by pre-defined shape models. For instance, bifurcations of arteries which cannot be modeled using a single tube or a blob may incorrectly result in zero v(x) (as shown around the center of the parameter image in FIG. 3B and consequently leads to discontinued contours at these locations. Despite the imperfection of both gradient image and parameter image, in FIG. 3A and FIG. 3B, errors on these two images result from different sources (reasons), for example a low contrast causes discontinuities in a gradient image while nonconformity with pre-defined models causes errors in a parameter image, thus they are less likely to occur at the same location. Based on this observation, an iterative process is disclosed in which the parameter image is iteratively updated by the gradient and the speed $g_I$, and in turn the mapping between the gradient and the speed is iteratively guided by an updated parameter image.

Figure 4:
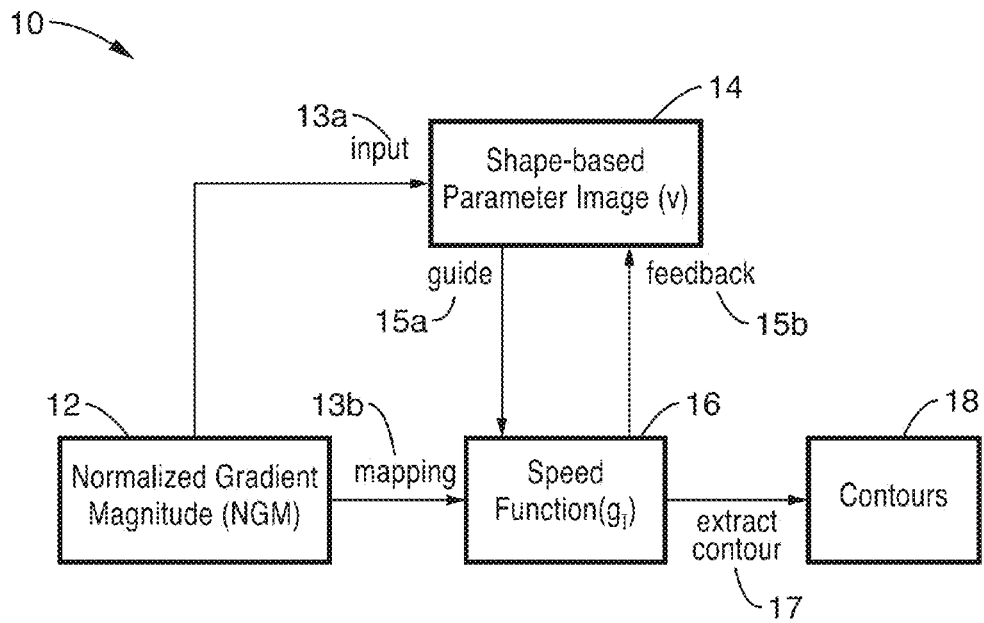
FIG. 4 is a flow diagram of performing Geodesic Active Contours (GAC) with adaptive configuration (adaptive GAC), utilized according to an embodiment of the present disclosure.

FIG. 4 illustrates an example embodiment 10 of Geodesic Active Contours with adaptive configuration according to an embodiment of the disclosure. Normalized gradient magnitude (NGM) in block 12 provides input 13a for shape-based parameter image (v) 14, and mapping information 13b for speed function ($g_I$) 16. Blocks 14 and 16 interact, with guide information 15a passed to the speed function 16, and feedback 15b passed to the shape-based parameter image 14. Extracted contours 17 are output from speed function 16 to a contours module 18.

2. Iterative Parameter Image Construction

An important element of iterative parameter image construction is based on the vessel continuity. The shape responses of a voxel $v_i$ should not be significantly different from that of a connected voxel $v_{i-1}$ if $v_{i-1}$ has been proven to reside in a vessel. This embodiment considers $v_i$ is connected with $v_{i-1}$ if $v_i$ is adjacent to $v_{i-1}$ and the gradient magnitude of $v_i$ is close to that of $v_{i-1}$. A voxel can be reliably classified as a vessel voxel if its speed function value is non-zero, which indicates both a large gradient magnitude and a non-zero shape response according to Eq. (4). The shape response of $v_i$ is replaced with the response of its connected voxel $v_{i-1}$ if the response of $v_i$ is much smaller than that of $v_{i-1}$. Once the parameter image is revised, the speed function is updated accordingly. The process iterates until the parameter image become stable.

Figure 5:
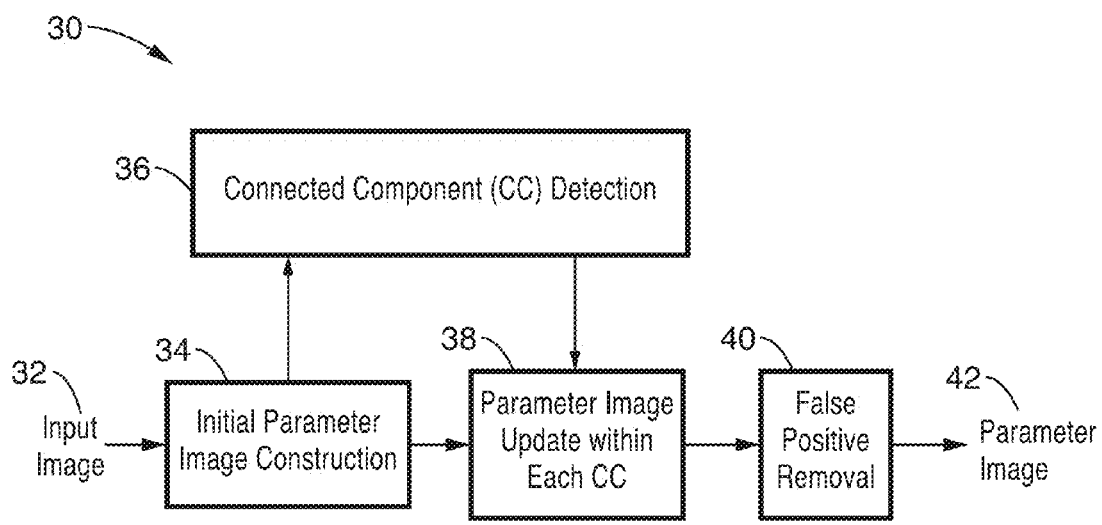
FIG. 5 is a flow diagram of performing iterative parameter image construction, utilized according to an embodiment of the present disclosure.

FIG. 5 illustrates an example embodiment 30 of iterative parameter image construction. It will be noted that the updated parameter image of FIG. 3B was shown in FIG. 3C, while FIG. 5 itself provides generalized steps of parameter image construction:

An input image 32 is seen received by block 34 performing an initial shape-based parameter image construction. In this block an image is first constructed based on matrix analysis, such as using a multiscale Hessian matrix analysis. In particular, two shape filters are employed to enhance tube-like and blob-like regions respectively as:

$$V_t = \begin{cases} 0 & \text{if } \lambda_2 > 0 \text{ or } \lambda_3 > 0 \\ \left(1 - \exp\left(-\frac{R_A^2}{a^2}\right)\right)\exp\left(-\frac{R_B^2}{b^2}\right)\left(1 - \exp\left(-\frac{S_A^2}{c^2}\right)\right) & \text{otherwise} \end{cases} \quad (5)$$

$$V_b = \begin{cases} 0 & \text{if } \lambda_1 > 0 \text{ or } \lambda_2 > 0 \text{ or } \lambda_3 > 0 \\ \left(1 - \exp\left(-\frac{S_A^2}{c^2}\right)\right) & \text{otherwise} \end{cases} \quad (6)$$

$$R_A = \frac{|\lambda_1|}{\sqrt{|\lambda_2 \lambda_3|}}, \quad R_B = \frac{|\lambda_2|}{|\lambda_3|}, \quad S = \sqrt{\lambda_1^2 + \lambda_2^2 + \lambda_3^2} \quad (7)$$

where $V_t$ and $V_b$ are tube and blob filters respectively; $\lambda_1$, $\lambda_2$ and $\lambda_3$ are eigenvalues of Hessian matrix and $|\lambda_1| \leq |\lambda_2| \leq |\lambda_3|$; a, b and c are weights modulating the relative contributions of the three components of filters. Each voxel of an initial parameter image is set as the greater value of $V_t$ and $V_b$ at the corresponding location. It is worth noting that although three more parameters (i.e., a, b and c) are introduced, like α, β and γ in Eq. (2), they are not sensitive to image content. Thus, these can be set statically and do not need to be exposed to end user modifications.

Output from the initial image construction 34 is received by a process of connected component (CC) detection 36, in which connected components (CC) are detected on the initial parameter image. Iterative updates to the parameter image are conducted within each connected component seen in block 38 which receives inputs from both block 34 and 36. This process is designed to facilitate false positive removal, which is performed in block 40, prior to output of a parameter image 42. It is possible that Eq. (5) and Eq. (6) may incorrectly produce non-zero responses to non-vessel tissues, especially on the edges of bones. After parameter image update, the false responses at bone tissues could spread widely, from edges to the entire bone tissues. To distinguish the true responses at vessels and the false responses at non-vessel tissues, two attributes of each connected component are analyzed: (1) the ratio of its size before and after the update, and (2) the size of each connected component.

Figure 6A:
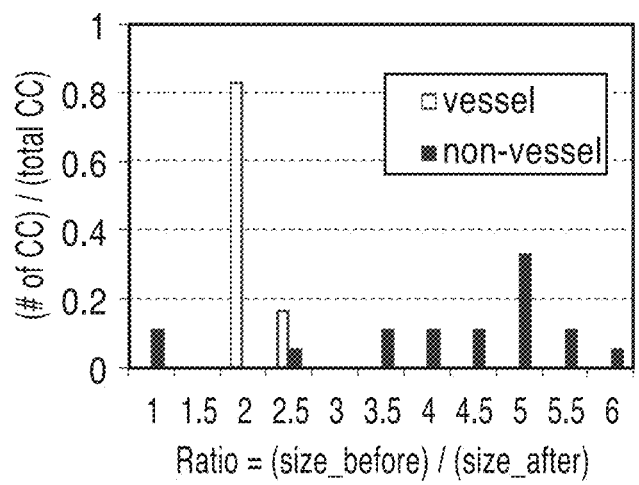
FIG. 6A through FIG. 6B are plots of ratio and size of segmentation distributions, respectively, which is a property utilized according to an embodiment of the present disclosure.
Figure 6B:
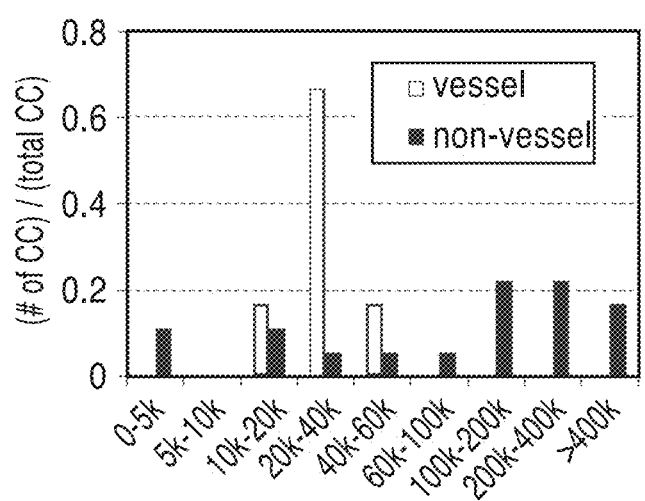

FIG. 6A and FIG. 6B illustrate an example comparing distributions in the ratio of connected components before and after expansion and sizing of connected components. Statistical analysis over multiple (e.g., eight) sets of clinical data reveal that the distributions of the two numbers are quite different for vessels and non-vessel tissues as seen in figure, thus a simple thresholding strategy can remove most false positives. Specifically, if the size ratio as seen in FIG. 6A is greater than 2.5 and the size as seen in FIG. 6B is greater than 60 k voxels, the component is unlikely to be a vessel. It should be noted that these threshold values are provided by way of example and not limitation, as thresholds may be chosen which best suit the application. It should also be noted that these threshold values, which are preferably chosen based on analysis of ground-truth data, do not require manual tuning by users. In principle, increased threshold accuracy can be obtained by processing larger amounts of ground-truth data.

3. Experimental Results

Quantitative evaluation of the disclosed method using clinical data are described below. First the datasets and evaluation metrics are described, followed by the results and analysis.

3.A Datasets

By way of example and not limitation this study consists of evaluation of eight CTA clinical datasets. Each dataset contains a 3D image volume including both anterior cerebral circulation arteries (ACCA) and posterior cerebral circulation arteries (PCCA). A single aneurysm appears on all datasets, four located at the bifurcation of middle cerebral arteries (MCA) and the other four located at the tip of basilar arteries (BA).

The acquisition of data in this non-limiting example was performed using multiple (e.g., 64) detectors in a scanner with 120 kV/250-300 mA for amplifier tube, 0.75 slice collimation and slice spacing of 0.5 mm. A total of 63 ml of non-ionic contrast fluid was intravenously administrated at a rate of 3 ml/s. The images were reconstructed on a 512×512 volume with a square field of view (FOV) of 18 cm, yielding an in-plane resolution of 0.35 mm.

3.B Evaluation Metric

The segmentation accuracy was evaluated by Dice Similarity Coefficient (DSC), a widely used metric for validation of segmentation algorithms in different medical image modalities. DSC is defined as:

$$DSC(S, G) = \frac{2 \times |S \cap G|}{|S| + |G|}, \quad (8)$$

where S and G represent segmented voxels and ground-truth voxels respectively; || denotes set cardinality. The ground-truth for evaluation is labeled manually by experts with slice-by-slice delineation of contours.

3.C Experimental Setup

In this section is described the setup for comparing the disclosed adaptively-configured geodesic active contours based on an iteratively-updated parameter image (AGAC-Iterative), with three other methods: region competition (RC), geodesic active contours (GAC), and a simplified version of the presently disclosed method, referred to as adaptive-configured GAC based on a parameter image constructed via a single round of shape filtering (AGAC-Single). For RC and GAC, the parameters are manually tuned to optimize segmentation results. Specifically, for the RC approach eight parameter values were uniformly chosen ranging from 1200 to 1900 for the upper bound intensity threshold, leading to eight configurations. For GAC, the value of v was set ranging from 0.016 to 0.044 with a step of 0.004, yielding eight configurations as well. For all methods, ten seeds were placed (i.e., 10 balloons with a radius of 2.0) as initial contours at the same locations of ACCA and PCCA respectively.

An open-source software application for medical image segmentation was utilized, in this instance ITK-SNAP with implementations for GAC and RC. For shape filtering based on multi-scale hessian matrix analysis, the implementation is built upon ITK (www.itk.org).

3.D Results

Figure 7A:
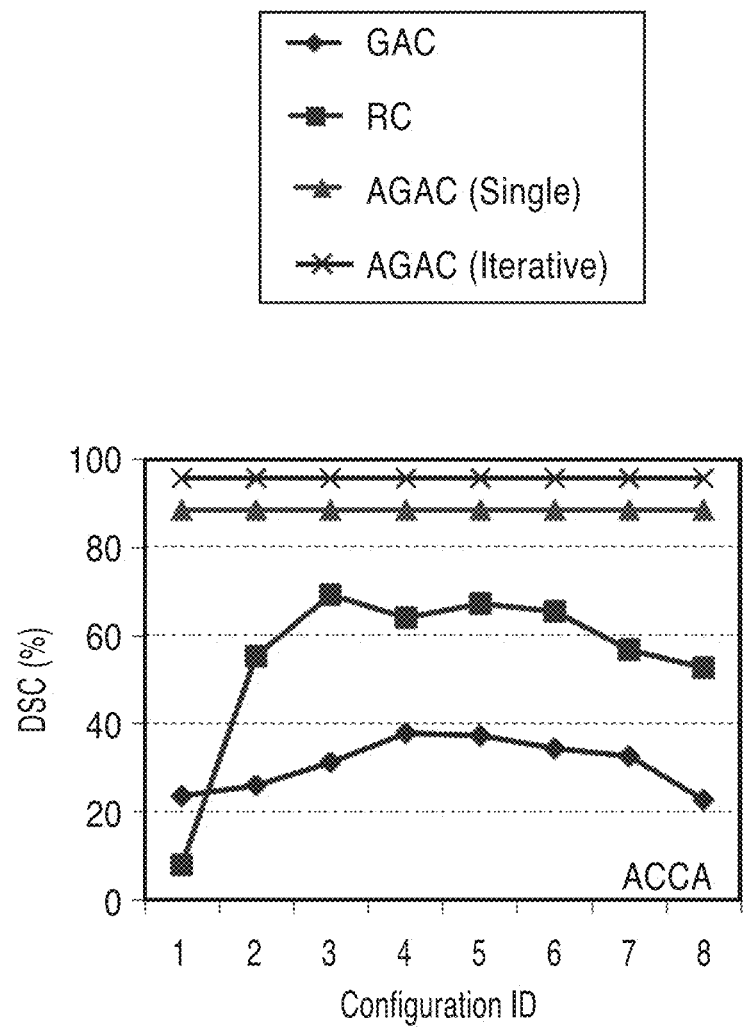
FIG. 7A through FIG. 7D are plots of segmentation results for different datasets and image types, comparing prior art segmentation and segmentation according to an embodiment of the present disclosure.
Figure 7B:
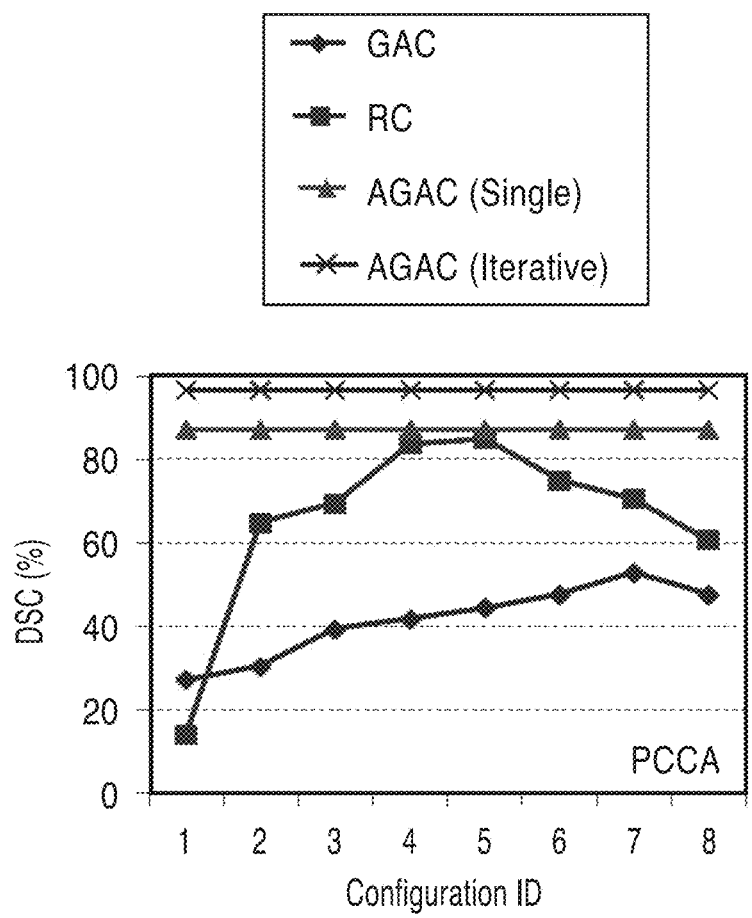
Figure 7C:
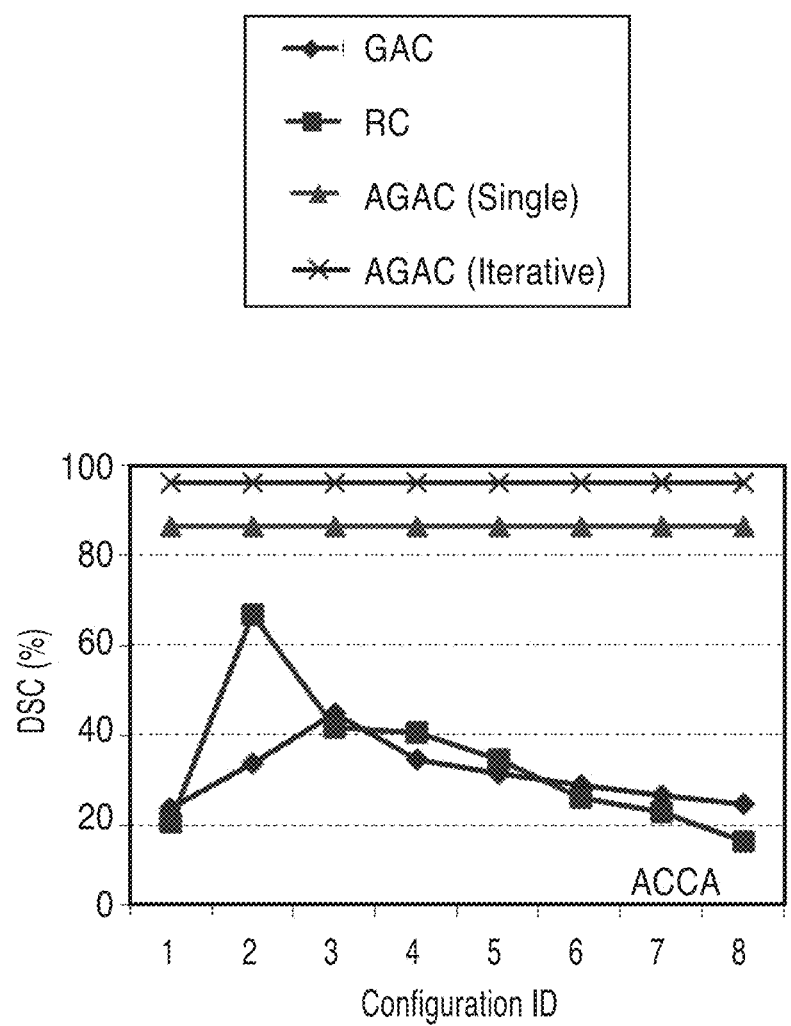
Figure 7D:
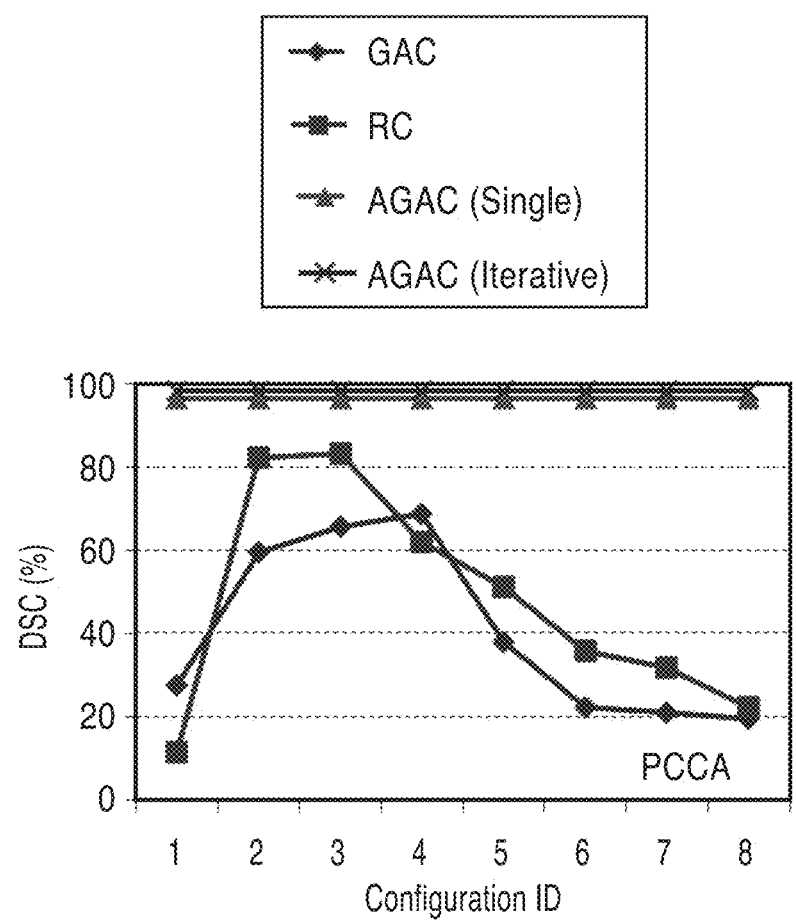
Figure 8A:
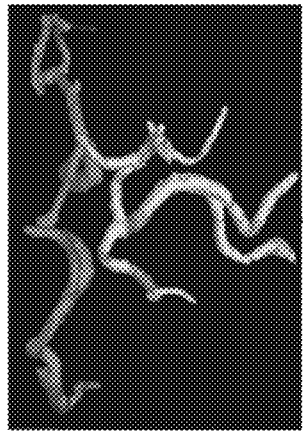
FIG. 8A through FIG. 8D are images of ground truth across four datasets.
Figure 8B:
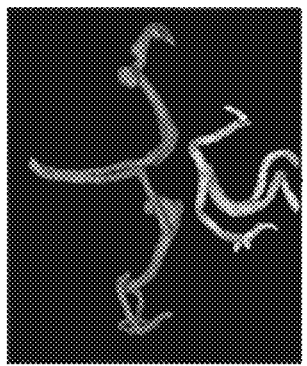
Figure 8C:
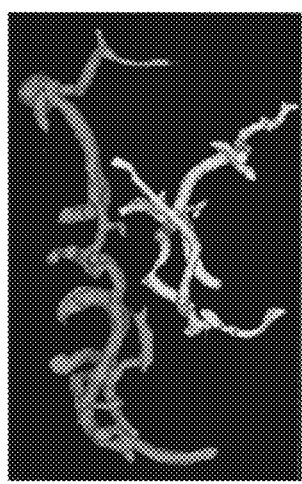
Figure 8D:
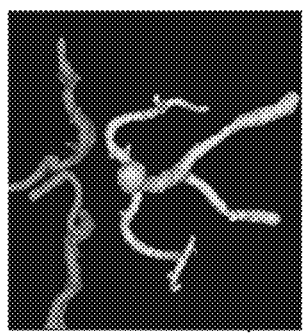
Figure 9A:
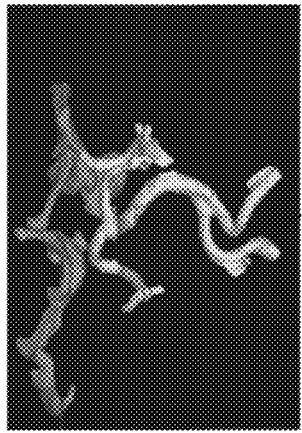
FIG. 9A through FIG. 9D are images of segmentation results using region competition (RC) with optimized configurations.
Figure 9B:
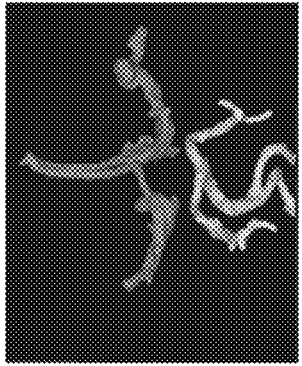
Figure 9C:
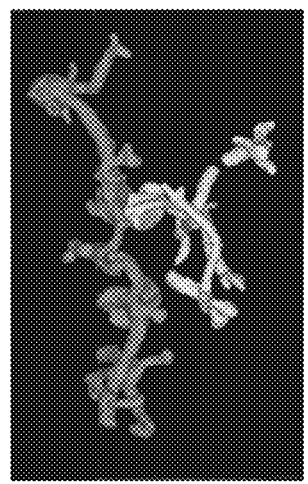
Figure 9D:
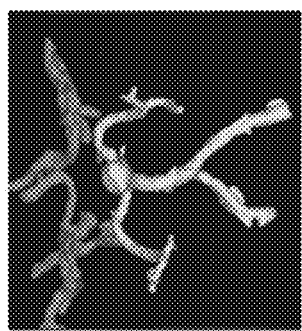
Figure 10A:
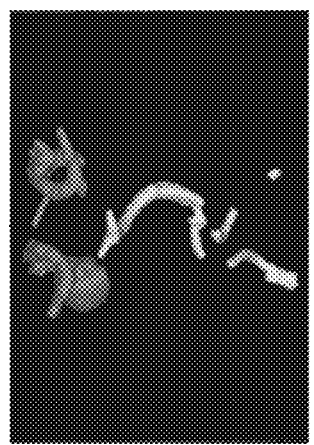
FIG. 10A through FIG. 10D are images of segmentation results using geodesic active contours (GAC) with optimized configurations.
Figure 10B:
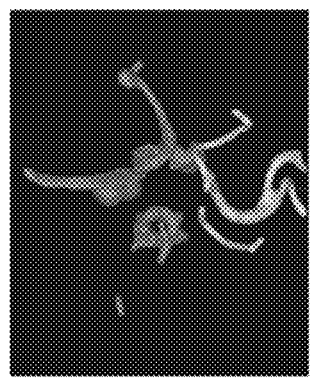
Figure 10C:
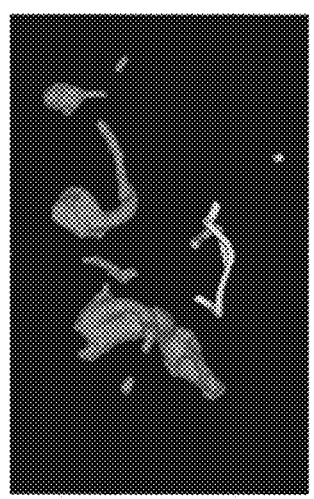
Figure 10D:
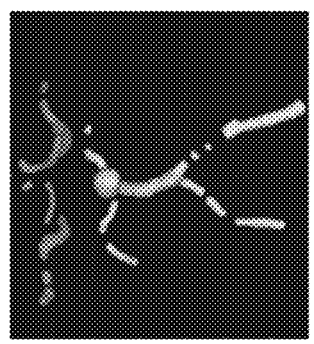
Figure 11A:
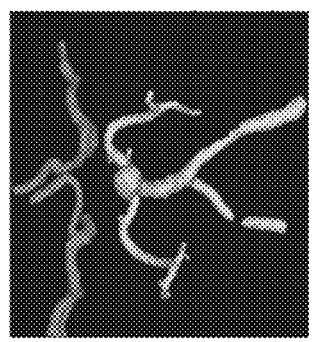
FIG. 11A through FIG. 11D are images of segmentation results based on adaptive GAC (single), according to an embodiment of the present disclosure.
Figure 11B:
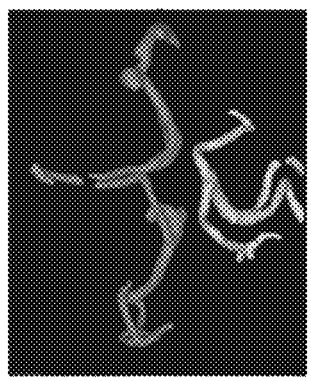
Figure 11C:
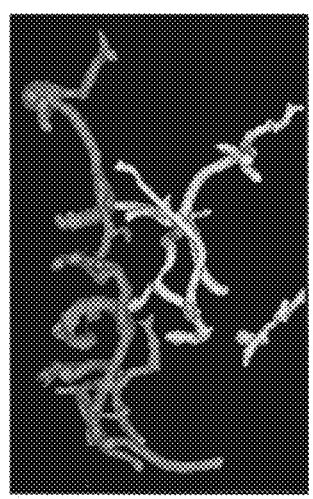
Figure 11D:
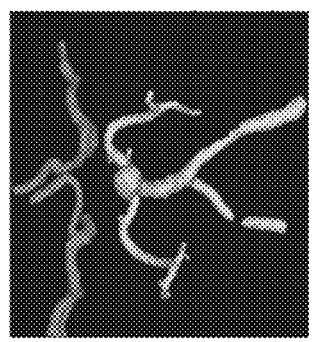
Figure 12A:
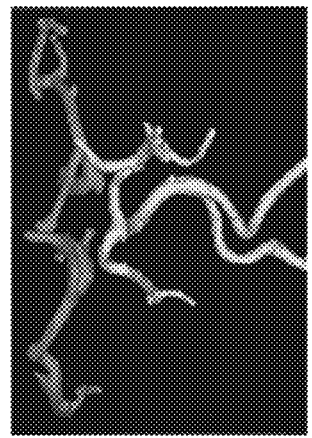
FIG. 12A through FIG. 12D are images of segmentation results based on adaptive GAC (iterative), according to an embodiment of the present disclosure.
Figure 12B:
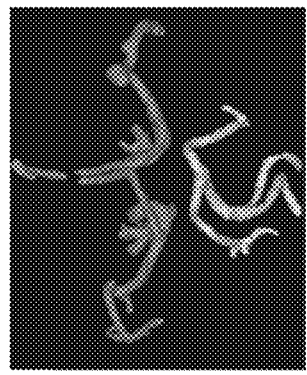
Figure 12C:
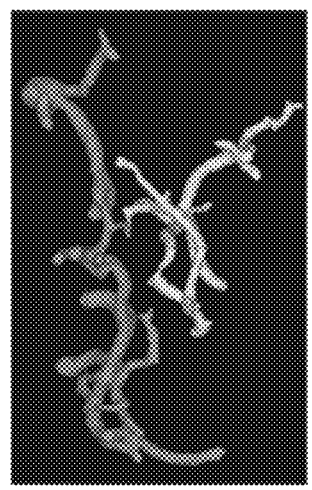
Figure 12D:
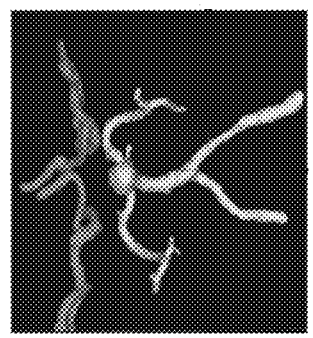

FIG. 7A through FIG. 7D illustrate DSC segmentation results for a Dataset 1 (FIG. 7A, FIG. 7B), and a Dataset 5 (FIG. 7C, FIG. 7D). The type of evaluation performed were for cerebral circulation arteries (ACCA) (FIG. 7A, FIG. 7C) and posterior cerebral circulation arteries (PCCA) (FIG. 7B, FIG. 7D). The plots compare use of the disclosed technique of AGAC in an iterative mode (AGAC-iterative), along with a simpler embodiment of the disclosure in a single pass mode (AGAC-single), with other techniques shown as geodesic active contours (GAC), and region competition (RC). It will be seen that the iterative AGAC method provides improved levels over the single pass AGAC, which both provide significant improvements over GAC and RC methods.

Two examples are used below to illustrate how sensitive the segmentation accuracy, measured by DSC, to the configurations for the conventional GAC and RC methods. FIG. 7A through FIG. 7D indicated DSC plots resulting from these eight different configurations for datasets 1 and 5. For GAC, the segmentation accuracy improves as v increases, until v reaches a certain value. This is because a larger v yields a greater expansion speed of a contour, resulting in a more complete segmentation. After v becomes sufficiently large, increasing v further will adversely degrade the accuracy (i.e., lower DSC). Since an excessively large v can lead to a non-zero speed at vessel edges which have small gradient magnitude values, yielding a leakage. Similar phenomenon was also observed for RC. Although for both datasets similar trends were observed for both RC and GAC, the configuration producing the greatest DSC is dataset-dependent and location-dependent. For example, for ACCA of dataset 1, the best result of GAC is achieved by configuration 4 while for dataset 5 the best result of GAC is produced by configuration 3. When comparing the GAC results of ACCA and PCCA of dataset 1, the greatest DSC is achieved by configurations 4 and 7 for ACCA and PCCA respectively. Similarly, RC's results are also dataset-dependent and location-dependent. In comparison, the disclosed methods, AGAC-Single and AGAC-Iterative, do not require manual tuning of parameters. Their final DSCs as a result are seen in the plots are substantially straight horizontal lines at a very high DSC % value. Clearly the disclosed methods outperform RC and GAC for both types of situations, ACCA and PCCA.

Table 1 and Table 2 provide a more detailed comparison of the four methods over the eight datasets. The DSC numbers for RC and GAC are based on the results of configurations which produce the most accurate segmentation among all explored configurations. Three observations can be made from these results:

For RC and GAC, even the best result, among all explored configurations, fails to provide a satisfactory segmentation. The DSC of RC is only 66.1-80.0% for ACCA and 57.1-89.1% for PCCA. For GAC, the DSC is even lower: 26.6-48.5% for ACCA and 27.1-75.8% for PCCA respectively. In general, the DSC of ACCA is lower than that of PCCA for both RC and GAC. This is mainly because ACCA are surrounded by sphenoid bone which appears closer to ACCA than PCCA. Therefore, leakage to the neighboring bone tissues is more likely to occur at ACCA locations. In addition, the geometric structure of ACCA is more complicated than that of PCCA. Therefore, segmentation of ACCA is more challenging than that of PCCA.

The disclosed adaptive GAC methods (single and iterative) consistently achieve superior performance to RC and GAC for all datasets. In addition, with help of the false positive removal process (outlined in FIG. 5), most of the non-vessel tissues are effectively removed, and hence leakage to adjacent bones is effectively prevented.

Iterative updates to a parameter image can prevent discontinuities arising from nonconformity with pre-defined shape models, and consequently improves segmentation results. By comparing the last two columns of Tables 1 and 2 it can be observed that AGAC (Iterative) further improves the performance of AGAC (Single) by 4.2-23.2% for ACCA and 2.0-14.2% for PCCA.

FIG. 8A through FIG. 8D illustrate ground-truth of dataset 1, 3, 4 and 5, respectively.

FIG. 9A through 12D present four exemplar segmentation results obtained by the four methods. In FIG. 9A through FIG. 9D and FIG. 10A through FIG. 10D depict segmentation results using region competition (RC) and geodesic active contours (GAC), respectively, with optimized configurations. In FIG. 11A through FIG. 11D, and FIG. 12A through FIG. 12D segmentation results are depicted based on adaptive GAC (single) and adaptive GAC (iterative), respectively. One shade denotes anterior cerebral circulation arteries and the other shading denotes posterior cerebral circulation arteries. Although the system is set to preferably output these distinctions using color coding throughout, its outputs are shown here in monochrome due to the limitations of the current patent application process.

4. Conclusions

In this disclosure, adaptively-configured GAC was introduced for segmentation of cerebral vessels and aneurysms. The method adaptively adjusts parameters by leveraging the local shape around an image voxel to guide the mapping between the gradient magnitude of the voxel and the evolution speed of a contour at its location. An iterative process is further introduced to improve the result of local shape analysis. Experimental results taken over eight clinical datasets demonstrate that the disclosed methods outperform two popular active contour segmentation methods (i.e., region competition and geodesic active contour) with manually optimized parameters.

This disclosure demonstrates the value of the adaptive configuration methods for GAC. However, it should be appreciated that the technology is applicable to other active contour methods, and can be applied to an adaptive configuration framework for general active contour methods which helps make active contour segmentation more easily usable by end users.

As can be seen, therefore, active contour is a popular technique for vascular segmentation. However, existing active contour segmentation methods require users to set values for various parameters, which require insights to the underlying formulation. Manual tuning of these parameters to optimize segmentation results is laborious for clinicians who often lack in-depth knowledge of the segmentation process steps. Moreover, a global parameter setting applied to all voxels of an input image can hardly achieve optimized results due to high appearance variability of vessels caused by the contrast agent inhomogeneity and noises. In this disclosure a new method is described which adaptively configures parameters for Geodesic Active Contours (GAC). The new method leverages shape filtering to produce a parameter image, each voxel of which is used to set parameters of GAC for the corresponding voxel of an input image. An iterative process is further developed to improve the accuracy of the shape-based parameter image. An evaluation study was made using eight clinical datasets demonstrating that the disclosed methods achieves greater segmentation accuracy than two popular active contour methods with manually optimized parameters.

The enhancements described in the presented technology can be readily implemented within various 3D image segmentation systems. It should also be appreciated that 3D image processing (segmentation) systems are preferably implemented to include one or more computer processor devices (e.g., CPUs, microprocessor, microcontroller, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with 3D image processing for segmentation. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A method for performing vascular segmentation of 3D images with adaptive parameter setting in a geodesic active contour (GAC) segmentation process, the method comprising: (a) acquiring 3D input images containing voxels as units of graphic information defining points in 3D space; (b) performing active contour segmentation on said 3D input images, wherein said segmentation evolves a closed curve/surface through a combination of different forces; (c) mapping gradient and speed function by using shape information as prior knowledge to guide the mapping between the gradient and speed function; (d) enhancing gradients at boundaries of vessel-like regions in the 3D input images; (e) suppressing gradients inside or outside vessel-like regions in the 3D input images; and (f) outputting segmentation contours for vessels found in the 3D input images; (g) wherein said method is performed by executing programming on at least one computer processor, said programming residing on a non-transitory medium readable by the computer processor.

2. The method of any preceding embodiment, further comprising generating a parameter image which is constructed based on shape filtering and each element of a parameter image is used to configure the speed function for the corresponding voxel of the 3D input images.

3. The method of any preceding embodiment, further comprising iteratively correcting a shape-based parameter image using result of gradient mapping as it provides complementary information to said shape information.

4. The method of any preceding embodiment, further comprising adaptively selecting a value for a parameter v across different regions or voxels of each of said 3D input images, wherein parameter v determines a shape for monotonic mapping between a normalized gradient magnitude and a speed function.

5. The method of any preceding embodiment, wherein a voxel from each of said 3D input image is classified as a vessel voxel if its speed function value is non-zero, indicating both a large gradient magnitude and a non-zero shape response.

6. The method of any preceding embodiment, wherein said 3D input images comprise Computed Tomography Angiograph (CTA) images.

7. The method of any preceding embodiment, wherein said 3D input images comprise aneurysm and surrounding vascular structure images.

8. A method for adapting a parameter image, the method comprising: (a) acquiring a 3D input image; (b) constructing an initial parameter image from the 3D input image; (c) iteratively updating the parameter image by a gradient and a speed value; and (d) iteratively guiding mapping between the gradient and the speed by an updated parameter image; (e) wherein said method is performed by executing programming on at least one computer processor, said programming residing on a non-transitory medium readable by the computer processor.

9. The method of any preceding embodiment, wherein said multiscale Hessian matrix analysis is performed using shape filters for tube-like and blob-like regions.

10. An apparatus for image segmentation by adaptively-configured geodesic active contours, comprising: (a) a computer processor configured for receiving 3D images upon which segmentation processing is to be performed; and (b) a non-transitory computer-readable memory storing instructions executable by the computer processor; (c) wherein said instructions, when executed by the computer processor, perform steps comprising: (c)(i) acquiring 3D input images; (c)(ii) mapping gradient and speed function by using shape information as prior knowledge to guide the mapping between the gradient and speed function; (c)(iii) enhancing gradients at boundaries of vessel-like regions in the 3D input images; and (c)(iv) suppressing gradients inside or outside vessel-like regions in the 3D input images.

11. The apparatus of any preceding embodiment, wherein said programming further comprises generating a parameter image which is constructed based on shape filtering and each element of a parameter image is used to configure the speed function for the corresponding voxel of the 3D input images.

12. The apparatus of any preceding embodiment, wherein said programming further comprises iteratively correcting a shape-based parameter image using result of gradient mapping as it provides complementary information to said shape information.

13. The apparatus of any preceding embodiment, wherein said programming further comprises adaptively selecting a value for parameter v, that determines shape of monotonic mapping between a normalized gradient magnitude and a speed function, across different regions or voxels of said 3D input images, wherein parameter v determines a shape for monotonic mapping between a normalized gradient magnitude and a speed function.

14. The apparatus of any preceding embodiment, wherein said programming further comprises classifying a voxel from said 3D input images as a vessel voxel if its speed function value is non-zero, indicating both a large gradient magnitude and a non-zero shape response.

15. The apparatus of any preceding embodiment, wherein said 3D input images comprise Computed Tomography Angiograph (CTA) images.

16. The apparatus of any preceding embodiment, wherein said 3D images comprise aneurysm and surrounding vascular structure images.

17. An apparatus for parameter image construction during 3D image segmentation, comprising: (a) a computer processor configured for receiving a 3D image upon which segmentation processing is to be performed; and (b) a non-transitory computer-readable memory storing instructions executable by the computer processor; (c) wherein said instructions, when executed by the computer processor, perform steps comprising: (c)(i) constructing an initial shape-based parameter image in response to performing a multiscale Hessian matrix analysis; (c)(ii) detecting connected components on the initial shape-based parameter image; (c)(iii) updating said shape-based parameter image with each detection of connected components; and (c)(iv) performing false positive rejections prior to outputting a parameter image.

18. The apparatus of any preceding embodiment, wherein said multiscale Hessian matrix analysis is performed using shape filters for tube-like and blob-like regions.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

DSC of ACCA using Different Methods

| Dataset ID | RC | GAC | AGAC (Single) | AGAC (Iterative) |
|---|---|---|---|---|
| 1 | 69.4 | 37.3 | 88.7 | 95.8 |
| 2 | 66.1 | 47.7 | 79.8 | 86.1 |
| 3 | 71.2 | 38.2 | 80.1 | 98.7 |
| 4 | 69.3 | 26.6 | 84.4 | 94.5 |
| 5 | 66.8 | 45.0 | 86.4 | 96.3 |
| 6 | 80.0 | 43.7 | 88.7 | 92.4 |
| 7 | 79.9 | 32.0 | 86.2 | 98.9 |
| 8 | 70.7 | 48.5 | 88.0 | 96.3 |

TABLE 2

DSC of PCCA using Different Methods

| Dataset ID | RC | GAC | AGAC (Single) | AGAC (Iterative) |
|---|---|---|---|---|
| 1 | 85.0 | 53.0 | 87.3 | 96.7 |
| 2 | 57.1 | 69.0 | 90.9 | 94.8 |
| 3 | 89.1 | 73.4 | 96.9 | 99.2 |
| 4 | 70.6 | 27.1 | 83.3 | 95.1 |
| 5 | 83.4 | 68.8 | 96.5 | 98.4 |
| 6 | 78.5 | 70.0 | 95.3 | 97.0 |
| 7 | 70.1 | 44.1 | 87.5 | 96.1 |
| 8 | 84.3 | 75.8 | 95.8 | 96.8 |

What is claimed is:

1. A method for performing vascular segmentation of 3D images with adaptive parameter setting in a geodesic active contour (GAC) segmentation process, the method comprising:
    (a) acquiring 3D input images containing voxels as units of graphic information defining points in 3D space;
    (b) performing active contour segmentation on said 3D input images, wherein said segmentation evolves a closed curve/surface through a combination of different forces;
    (c) mapping gradient and speed function by using shape information as prior knowledge to guide the mapping between the gradient and speed function;
    (d) enhancing gradients at boundaries of vessel-like regions in the 3D input images;
    (e) suppressing gradients inside or outside vessel-like regions in the 3D input images;
    (f) iteratively correcting a shape-based parameter image using result of gradient mapping as it provides complementary information to said shape information; and
    (g) outputting segmentation contours for vessels found in the 3D input images;
    (h) wherein said method is performed by executing programming on at least one computer processor, said programming residing on a non-transitory medium readable by the computer processor.

2. The method as recited in claim 1, further comprising generating a parameter image which is constructed based on shape filtering and each element of a parameter image is used to configure the speed function for the corresponding voxel of the 3D input images.

3. The method as recited in claim 1, further comprising adaptively selecting a value for parameter v across different regions or voxels of each of said 3D input images, wherein parameter v determines a shape for monotonic mapping between a normalized gradient magnitude and a speed function.

4. The method as recited in claim 1, wherein a voxel from each of said 3D input image is classified as a vessel voxel if its speed function value is non-zero, indicating both a large gradient magnitude and a non-zero shape response.

5. The method as recited in claim 1, wherein said 3D input images comprise Computed Tomography Angiograph (CTA) images.

6. The method as recited in claim 1, wherein said 3D input images comprise aneurysm and surrounding vascular structure images.

7. An apparatus for image segmentation by adaptively-configured geodesic active contours, comprising:
    (a) a computer processor configured for receiving 3D images upon which segmentation processing is to be performed; and
    (b) a non-transitory computer-readable memory storing instructions executable by the computer processor;
    (c) wherein said instructions, when executed by the computer processor, perform steps comprising:
        (i) acquiring 3D input images;
        (ii) mapping gradient and speed function by using shape information as prior knowledge to guide the mapping between the gradient and speed function;
        (iii) iteratively correcting a shape-based parameter image using result of gradient mapping as it provides complementary information to said shape information;
        (iv) enhancing gradients at boundaries of vessel-like regions in the 3D input images; and
        (v) suppressing gradients inside or outside vessel-like regions in the 3D input images.

8. The apparatus as recited in claim 7, wherein said programming further comprises generating a parameter image which is constructed based on shape filtering and each element of a parameter image is used to configure the speed function for the corresponding voxel of the 3D input images.

9. The apparatus as recited in claim 7, wherein said programming further comprises adaptively selecting a value for parameter v across different regions or voxels of said 3D input images, wherein parameter v determines a shape for monotonic mapping between a normalized gradient magnitude and a speed function.

10. The apparatus as recited in claim 7, wherein said programming further comprises classifying a voxel from said 3D input images as a vessel voxel if its speed function value is non-zero, indicating both a large gradient magnitude and a non-zero shape response.

11. The apparatus as recited in claim 7, wherein said 3D input images comprise Computed Tomography Angiograph (CTA) images.

12. The apparatus as recited in claim 7, wherein said 3D images comprise aneurysm and surrounding vascular structure images.

13. A method for performing vascular segmentation of 3D images with adaptive parameter setting in a geodesic active contour (GAC) segmentation process, the method comprising:
(a) acquiring 3D input images containing voxels as units of graphic information defining points in 3D space;
(b) performing active contour segmentation on said 3D input images, wherein said segmentation evolves a closed curve/surface through a combination of different forces;
(c) adaptively selecting a value for parameter v, during said active contour segmentation, across different regions or voxels of each of said 3D input images, wherein parameter v determines a shape for monotonic mapping between a normalized gradient magnitude and a speed function;
(d) mapping gradient and speed function by using shape information as prior knowledge to guide the mapping between the gradient and speed function;
(e) enhancing gradients at boundaries of vessel-like regions in the 3D input images;
(f) suppressing gradients inside or outside vessel-like regions in the 3D input images; and
(g) outputting segmentation contours for vessels found in the 3D input images;
(h) wherein said method is performed by executing programming on at least one computer processor, said programming residing on a non-transitory medium readable by the computer processor.

14. The method as recited in claim 13, further comprising generating a parameter image which is constructed based on shape filtering and each element of a parameter image is used to configure the speed function for the corresponding voxel of the 3D input images.

15. The method as recited in claim 13, further comprising iteratively correcting a shape-based parameter image using result of gradient mapping as it provides complementary information to said shape information.

16. The method as recited in claim 13, wherein a voxel from each of said 3D input image is classified as a vessel voxel if its speed function value is non-zero, indicating both a large gradient magnitude and a non-zero shape response.

17. The method as recited in claim 13, wherein said 3D input images comprise Computed Tomography Angiograph (CTA) images.

18. The method as recited in claim 13, wherein said 3D input images comprise aneurysm and surrounding vascular structure images.

19. A method for performing vascular segmentation of 3D images with adaptive parameter setting in a geodesic active contour (GAC) segmentation process, the method comprising:
(a) acquiring 3D input images containing voxels as units of graphic information defining points in 3D space;
(b) performing active contour segmentation on said 3D input images, wherein said segmentation evolves a closed curve/surface through a combination of different forces;
(c) mapping gradient and speed function by using shape information as prior knowledge to guide the mapping between the gradient and speed function;
(d) wherein a voxel from each of said 3D input image is classified as a vessel voxel if its speed function value is non-zero, indicating both a large gradient magnitude and a non-zero shape response;
(e) enhancing gradients at boundaries of vessel-like regions in the 3D input images;
(f) suppressing gradients inside or outside vessel-like regions in the 3D input images; and
(g) outputting segmentation contours for vessels found in the 3D input images;
(h) wherein said method is performed by executing programming on at least one computer processor, said programming residing on a non-transitory medium readable by the computer processor.

20. The method as recited in claim 19, further comprising generating a parameter image which is constructed based on shape filtering and each element of a parameter image is used to configure the speed function for the corresponding voxel of the 3D input images.

21. The method as recited in claim 19, further comprising iteratively correcting a shape-based parameter image using result of gradient mapping as it provides complementary information to said shape information.

22. The method as recited in claim 19, further comprising adaptively selecting a value for parameter v across different regions or voxels of each of said 3D input images, wherein parameter v determines a shape for monotonic mapping between a normalized gradient magnitude and a speed function.

23. The method as recited in claim 19, wherein said 3D input images comprise Computed Tomography Angiograph (CTA) images.

24. The method as recited in claim 19, wherein said 3D input images comprise aneurysm and surrounding vascular structure images.

25. An apparatus for image segmentation by adaptively-configured geodesic active contours, comprising:
(a) a computer processor configured for receiving 3D images upon which segmentation processing is to be performed; and
(b) a non-transitory computer-readable memory storing instructions executable by the computer processor;
(c) wherein said instructions, when executed by the computer processor, perform steps comprising:
(i) acquiring 3D input images;
(ii) mapping gradient and speed function by using shape information as prior knowledge to guide the mapping between the gradient and speed function;
(iii) adaptively selecting a value for parameter v across different regions or voxels of said 3D input images, wherein parameter v determines a shape for monotonic mapping between a normalized gradient magnitude and a speed function;
(iv) enhancing gradients at boundaries of vessel-like regions in the 3D input images; and
(v) suppressing gradients inside or outside vessel-like regions in the 3D input images.

26. The apparatus as recited in claim 25, wherein said programming further comprises generating a parameter image which is constructed based on shape filtering and each element of a parameter image is used to configure the speed function for the corresponding voxel of the 3D input images.

27. The apparatus as recited in claim 25, wherein said programming further comprises iteratively correcting a shape-based parameter image using result of gradient mapping as it provides complementary information to said shape information.

28. The apparatus as recited in claim 25, wherein said programming further comprises classifying a voxel from said 3D input images as a vessel voxel if its speed function value is non-zero, indicating both a large gradient magnitude and a non-zero shape response.

29. The apparatus as recited in claim 25, wherein said 3D input images comprise Computed Tomography Angiograph (CTA) images.

30. The apparatus as recited in claim 25, wherein said 3D images comprise aneurysm and surrounding vascular structure images.

31. An apparatus for image segmentation by adaptively-configured geodesic active contours, comprising:
 (a) a computer processor configured for receiving 3D images upon which segmentation processing is to be performed; and
 (b) a non-transitory computer-readable memory storing instructions executable by the computer processor;
 (c) wherein said instructions, when executed by the computer processor, perform steps comprising:
  (i) acquiring 3D input images;
  (ii) mapping gradient and speed function by using shape information as prior knowledge to guide the mapping between the gradient and speed function;
  (iii) classifying a voxel from said 3D input images as a vessel voxel if its speed function value is non-zero, indicating both a large gradient magnitude and a non-zero shape response;
  (iv) enhancing gradients at boundaries of vessel-like regions in the 3D input images; and
  (v) suppressing gradients inside or outside vessel-like regions in the 3D input images.

32. The apparatus as recited in claim 31, wherein said programming further comprises generating a parameter image which is constructed based on shape filtering and each element of a parameter image is used to configure the speed function for the corresponding voxel of the 3D input images.

33. The apparatus as recited in claim 31, wherein said programming further comprises iteratively correcting a shape-based parameter image using result of gradient mapping as it provides complementary information to said shape information.

34. The apparatus as recited in claim 31, wherein said programming further comprises adaptively selecting a value for parameter v across different regions or voxels of said 3D input images, wherein parameter v determines a shape for monotonic mapping between a normalized gradient magnitude and a speed function.

35. The apparatus as recited in claim 31, wherein said 3D input images comprise Computed Tomography Angiograph (CTA) images.

36. The apparatus as recited in claim 31, wherein said 3D images comprise aneurysm and surrounding vascular structure images.

* * * * *